(12) United States Patent
Hung

(10) Patent No.: US 9,705,439 B1
(45) Date of Patent: Jul. 11, 2017

(54) FAN DRIVER SYSTEM AND ANALOG FAN DRIVE CHIP

(71) Applicant: NUVOTON TECHNOLOGY CORPORATION, Hsinchu (TW)

(72) Inventor: Ming-Che Hung, Hsinchu Science Park (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 15/225,023

(22) Filed: Aug. 1, 2016

(30) Foreign Application Priority Data

Dec. 23, 2015 (TW) .............................. 104143307 A

(51) Int. Cl.
G05B 11/28 (2006.01)
H02P 7/29 (2016.01)
(52) U.S. Cl.
CPC ..................................... *H02P 7/29* (2013.01)
(58) Field of Classification Search
CPC ...... H02P 3/00; H02P 5/00; H02P 6/00; H02P 7/00; H02P 8/00; H02P 21/00; H02P 23/00; H02P 25/00; H02P 1/46; H02P 3/18; G05B 11/28; G05D 23/00
USPC ..... 318/400.01, 400.14, 599, 700, 701, 727, 318/779, 799, 430, 432, 437; 361/679.48, 361/695; 700/300; 702/96, 99, 132, 108, 702/53, 133
See application file for complete search history.

(56) References Cited

U.S. PATENT DOCUMENTS 7,313,466 B2 * 12/2007 Chang ................ H05K 7/20209
361/679.48

* cited by examiner

*Primary Examiner* — Antony M Paul
(74) *Attorney, Agent, or Firm* — Muncy, Geissler, Olds & Lowe, P.C.

(57) ABSTRACT

A fan driver system is provided, which includes a PWM generator, a DC generator, a control unit, a pull-down resistor and an integrator. The DC generator generates a DC test voltage, and a voltage of the pull-down resistor is detected to generate a determination signal. The PWM generator provides first and second PWM test signals having different duty cycles to the fan, respectively. The integrator integrates speed signal from the fan and corresponding to the first PWM test signal, to output a first integral signal, and integrates the speed signal corresponding to the second PWM test signal, to output a second integral signal. According to the first and second integral signals, and the determination signal, the control unit drives the PWM generator to selectively provide PWM working signal to the fan, and drive the DC generator to provide DC working voltage to the fan.

13 Claims, 10 Drawing Sheets

FAN DRIVER SYSTEM AND ANALOG FAN DRIVE CHIP

CROSS-REFERENCE TO RELATED APPLICATION

This application claims the benefit of Taiwan Patent Application No. 104143307, filed on Dec. 23, 2015, the disclosure of which is incorporated herein in its entirety by reference, in the Taiwan Intellectual Property Office.

BACKGROUND OF THE INVENTION

1. Field of the Invention

The present disclosure relates to a fan driver system and an analog fan drive chip, more particularly to an analog fan drive chip capable of automatically detecting a type of a fan.

2. Description of the Related Art

With progress in electronic technologies, various electronic devices (such as processor, display card or other device) have higher and higher working frequencies and power consumption, but also generate more heat during operations. In order to prevent the devices from being damaged because of overheat, cooling devices are usually required to decrease temperatures of these devices. Generally, fans are cooling devices widely used. A fan is usually disposed near the electronic device to be cooled, and configured to generate air flow around the electronic device for heat dissipation. The fan operated in a higher speed can blow hot air away from the electronic component more quickly, so as to provide higher cooling efficiency. Currently, commercially available fans can be classified into three-wire direct current (DC) fan and four-wire pulse width modulation (PWM) fan. According to a specification defined by the INTEL Corporation, the four-wire PWM fan must be provided with a built-in pull-up resistor. However, many four-wire PWM fans which do not meet the requirement of the specification of the INTEL Corporation are also commercially available. That is, some commercially available four-wire PWM fans do not have the built-in pull-up resistor.

Please refer to FIG. 1 which shows an interface 102 of a general three-wire DC fan 104. The interface 102 includes a ground terminal 106, a DC signal terminal 108 and a speed signal terminal 110. The speed signal terminal 110 is configured to provide a speed signal of the fan, and the speed signal is a square wave having a frequency proportional to the speed of the three-wire DC fan 104. The speed of the three-wire DC fan 104 can be controlled by the voltage input in the DC signal terminal 108. During operation of the fan, the voltage applied to the DC signal terminal 108 is adjustable, for example, in a range from 4V to 12V, for fan speed control. The speed of the three-wire DC fan 104 is positively relevant to amplitude of the voltage applied to the DC signal terminal 108. Higher the voltage input to the DC signal terminal 108 is, faster the speed of the fan is.

Please refer to FIG. 2 which shows an interface 202 of a general four-wire PWM fan 204. The four-wire PWM fan 204 may be provided with/without a built-in pull-up resistor. The four-wire PWM fan 204 has a ground terminal 206, a DC signal terminal 208, a speed signal terminal 210 and a PWM control terminal 212. The DC signal terminal 208 and the speed signal terminal 210 of the four-wire PWM fan 204 are similar to the DC signal terminal 108 and the speed signal terminal 110 of the three-wire DC fan 104. The speed of the four-wire PWM fan 204 is controlled by a duty cycle of the PWM signal applied to the PWM control terminal 212, but not the voltage applied to the DC signal terminal 208. For the four-wire PWM fan 204, the DC signal terminal 208 is usually kept as a fixed voltage. When the duty cycle of the PWM signal applied to the PWM control terminal 212 is 50%, the speed of the four-wire PWM fan 204 is 50% of a full speed of the four-wire PWM fan 204. Similarly, when the duty cycle of the PWM signal input to the PWM control terminal 212 is 80%, the speed of the four-wire PWM fan 204 is 80% of the full speed. That is, when the duty cycle of the PWM signal applied to the PWM control terminal 212 is increased or decreased, the speed of the four-wire PWM fan 204 is increased or decreased correspondingly.

Generally speaking, the electronic device is usually designed to just support a certain type of the fan, so the user is required to connect a correct type of the fan to the electronic device for better heat-dissipation performance; however, it is inconvenient for the user who does not know the type of the fan supported by the electronic device. For example, prior to selection of the fan for a computer, the user had better check a motherboard of the computer to know the supportable type of the fan.

In prior art, a tachometer is used to detect the type of the fan, so as to solve above-mentioned problem. The tachometer requires a clock signal to count a number of cycles of the speed signal of the fan in a preset period, but a clock circuit cannot be designed in an analog chip.

SUMMARY OF THE INVENTION

In order to solve the problem in prior art, an objective of the present disclosure is to provide a fan driver system and an analog fan drive chip capable of automatically detecting the type of the fan, and the relevant circuit components can be produced in similar manufacturing process.

To achieve the objective, the present disclosure provides a fan driver system applied to detect the type of the fan and drive the fan according to a detection result. The fan driver system includes a direct current (DC) generator, a pull-down resistor, an input determination circuit, a control unit, a pulse width modulation (PWM) generator, an integrator and a voltage sensing circuit. The DC generator is electrically connected to the fan, the pull-down resistor is electrically connected to the fan selectively, and the input determination circuit is electrically connected to the pull-down resistor and configured to detect a voltage of the pull-down resistor, and output a determination signal according to the detected voltage. The control unit is electrically connected to the input determination circuit and the DC generator, and configured to receive the determination signal. The PWM generator is electrically connected to the fan and the control unit, and configured to provide a first PWM test signal and a second PWM test signal to the fan, respectively. A first duty cycle of the first PWM test signal is different from a second duty cycle of the second PWM test signal. The integrator is electrically connected to the fan and configured to integrate a speed signal from the fan and corresponding to the first PWM test signal, so as to output a first integral signal, and integrate the speed signal corresponding to the second PWM test signal, so as to output a second integral signal. The voltage sensing circuit is electrically connected to the integrator and the control unit. According to the first integral signal, the second integral signal and the determination signal, the control unit is configured to drive the PWM generator to selectively provide a PWM working signal to the fan, and drive the DC generator to provide a DC working voltage to the fan.

Preferably, the fan driver system further includes a switch electrically connected to the control unit, the integrator and the fan. Under a condition that the PWM generator is switched from the first PWM test signal to the second PWM test signal, after the second PWM test signal is output for a predetermined period, the control unit is configured to turn off the switch to disconnect the integrator and the fan.

Preferably, when the first integral signal is not equal to the second integral signal and the determination signal indicates that the voltage of the pull-down resistor is in high-level, the fan is determined as a four-wire PWM fan with a built-in pull-up resistor, and the speed of the fan is adjustable by changing a duty cycle of the PWM working signal. When the first integral signal is not equal to the second integral signal and the determination signal indicates that the voltage of the pull-down resistor is in low-level, the fan is determined as a four-wire PWM fan without the built-in pull-up resistor, and the speed of the fan is adjustable by changing a duty cycle of the PWM working signal. When the first integral signal is equal to the second integral signal and the determination signal indicates that the voltage of the pull-down resistor is in low-level, the fan is determined as a three-wire DC fan, and the speed of the fan is adjustable by changing amplitude of the DC working voltage.

To achieve the objective, the present disclosure further provides an analog fan drive chip applied to detect a type of a fan and drive the fan according to detection result. The analog fan drive chip includes a first pin, a second pin, a third pin, a DC generator, a pull-down resistor, an input determination circuit, a control unit, a PWM generator, an integrator and a voltage sensing circuit. The first pin is electrically connected to the fan selectively. The second pin is electrically connected to the fan. The third pin is electrically connected to the fan. The DC generator is electrically connected to the third pin and configured to provide a DC test voltage to the fan. The pull-down resistor is electrically connected to the first pin. The input determination circuit is electrically connected to the pull-down resistor and configured to detect a voltage of the pull-down resistor while the DC test voltage is provided, and output a determination signal according to the detected voltage. The control unit is electrically connected to the input determination circuit and the DC generator, and configured to receive the determination signal. The PWM generator is electrically connected to the first pin and the control unit, and configured to provide a first PWM test signal and a second PWM test signal to the fan. A first duty cycle of the first PWM test signal is different from a second duty cycle of the second PWM test signal. The integrator is electrically connected to the second pin and configured to integrate a speed signal which is from the fan and corresponds to the first PWM test signal, so as to output a first integral signal, and integrate the speed signal corresponding to the second PWM test signal, so as to output a second integral signal. The voltage sensing circuit is electrically connected to the integrator and the control unit. According to the first integral signal, the second integral signal and the determination signal, the control unit is configured to drive the PWM generator to selectively provide a PWM working signal to the fan, and drive the DC generator to provide a DC working voltage to the fan.

To achieve the objective, the present disclosure further provides an analog fan drive chip applied to detect a type of a fan and drive the fan according to detection result. The analog fan drive chip is electrically connected to a switch and an integrator, and includes a first pin, a second pin, a third pin, a fourth pin, a DC generator, a pull-down resistor, an input determination circuit, a control unit, a PWM generator and a voltage sensing circuit. The first pin is electrically connected to the fan selectively. The second pin is electrically connected to the switch. The third pin is electrically connected to the fan through the integrator and the switch. The fourth pin is electrically connected to the fan. The DC generator is electrically connected to the fourth pin and configured to provide a DC test voltage to the fan. The pull-down resistor is electrically connected to the first pin. The input determination circuit is electrically connected to the pull-down resistor and configured to detect a voltage of the pull-down resistor while the DC test voltage is provided, and output a determination signal according to the detected voltage. The control unit is electrically connected to the input determination circuit and the DC generator, and configured to receive the determination signal. The PWM generator is electrically connected to the first pin and the control unit, and configured to provide a first PWM test signal and a second PWM test signal to the fan. A first duty cycle of the first PWM test signal is different from a second duty cycle of the second PWM test signal. The voltage sensing circuit is electrically connected to the first pin and the control unit. The integrator integrates a speed signal from the fan and corresponding to the first PWM test signal, so as to output a first integral signal, and integrate the speed signal corresponding to the second PWM test signal, so as to output a second integral signal. Under a condition that the PWM generator switches from the first PWM test signal to the second PWM test signal, after the second PWM test signal is output for a predetermined period, the control unit turns off the switch to disconnect the integrator and the fan. The control unit is electrically connected to the integrator through the second pin, and according to the first integral signal, the second integral signal and the determination signal the control unit drives the PWM generator to provide a PWM working signal to the fan, and drives the DC generator to provide a DC working voltage to the fan.

To achieve the objective, the present disclosure further provides a fan driver system applied to detect a type of the fan and drive the fan according to a detection result. The fan driver system includes a PWM generator, an integrator, a voltage sensing circuit, a control unit and a DC generator. The PWM generator is electrically connected to the fan selectively and configured to provide a first PWM test signal and a second PWM test signal to the fan. A first duty cycle of the first PWM test signal is different from a second duty cycle of the second PWM test signal. The integrator is electrically connected to the fan and integrates a speed signal from the fan corresponding to the first PWM test signal, so as to output a first integral signal, and integrate the speed signal corresponding to the second PWM test signal, so as to output a second integral signal. The voltage sensing circuit is electrically connected to the integrator. The control unit is electrically connected to the PWM generator and the voltage sensing circuit and configured to control the PWM generator to selectively provide a PWM working signal to the fan according to comparison between the first integral signal and the second integral signal. The DC generator is electrically connected to the fan and the control unit, and the control unit is configured to control the DC generator to provide a DC working voltage to the fan according to the comparison between the first integral signal and the second integral signal.

Preferably, when the first integral signal is not equal to the second integral signal, the PWM generator is configured to change a duty cycle of the PWM working signal to control the speed of the fan. When the first integral signal and the second integral signal are almost the same and the first integral signal is not equal to zero substantially, the DC generator is configured to change amplitude of the DC working voltage to control the speed of the fan.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
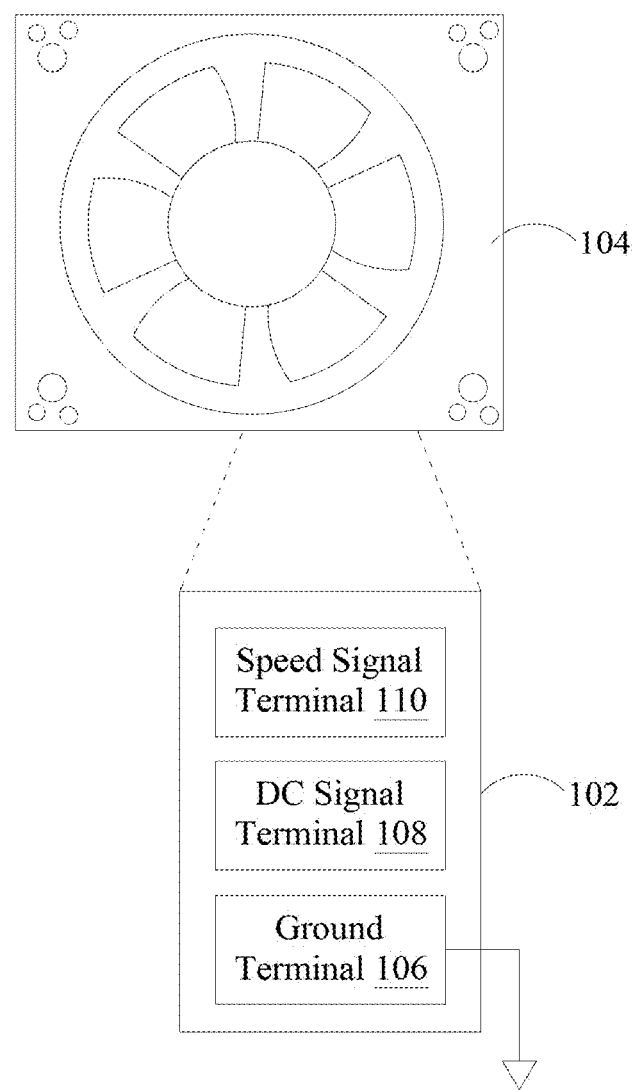
FIG. 1 is a schematic view of a general three-wire DC fan.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 3:
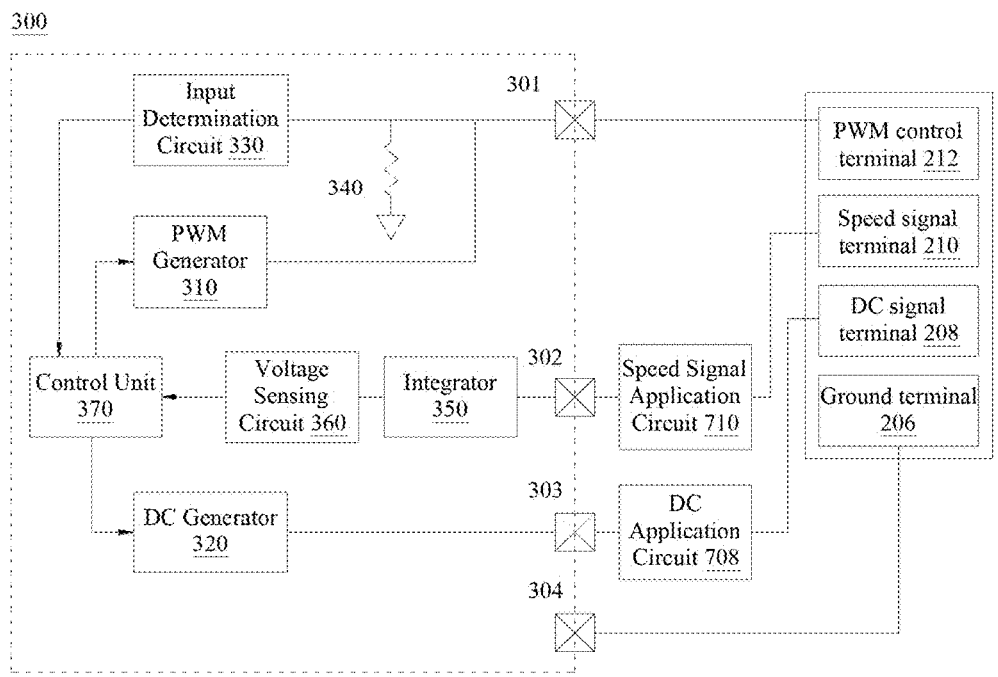
FIG. 3 is a block diagram of a fan driver system of a first embodiment of the invention.

Please refer to FIG. 3 which shows a block diagram of a fan driver system of a first embodiment of the invention. The fan driver system includes a pulse width modulation (PWM) signal generator 310, a direct current (DC) generator 320, an input determination circuit 330, an integrator 350, a voltage sensing circuit 360 and a control unit 370. The PWM generator 310 is selectively connected to a PWM control terminal 212 of a fan. The DC generator 320 is connected to a DC signal terminal 208 of the fan. The input determination circuit 330 is selectively connected to the PWM control terminal 212 of the fan. The PWM generator 310, the DC generator 320 and the input determination circuit 330 are connected with the control unit 370. The pull-down resistor 340 is electrically connected to the input determination circuit 330 and selectively connected to the PWM control terminal 212 of the fan. The integrator 350 is electrically connected to a fan speed signal terminal 210 of the fan, and further connected to the control unit 370 through the voltage sensing circuit 360. During a test stage, the DC generator 320 is configured to provide a DC test voltage, and the input determination circuit 330 is configured to detect a voltage of the pull-down resistor 340 while the DC test voltage is provided, and further output a determination signal to the control unit 370 according to the detected voltage. The PWM generator 310 is configured to provide a first PWM test signal having a first duty cycle, and a second PWM test signal having a second duty cycle which is different from the first duty cycle. During the first PWM test signal the integrator 350 is configured to integrate a speed signal from the fan to output a first integral signal, and during the second PWM test signal the integrator 350 integrates the speed signal to output a second integral signal. The first integral signal and the second integral signal are transmitted to the control unit 370. During an operation stage, according to the first integral signal, the second integral signal and the determination signal the control unit 370 is configured to selectively control the PWM generator 310 to provide a PWM working signal to the fan, and control the DC generator 320 to provide a DC working voltage to the fan.

Figure 2:
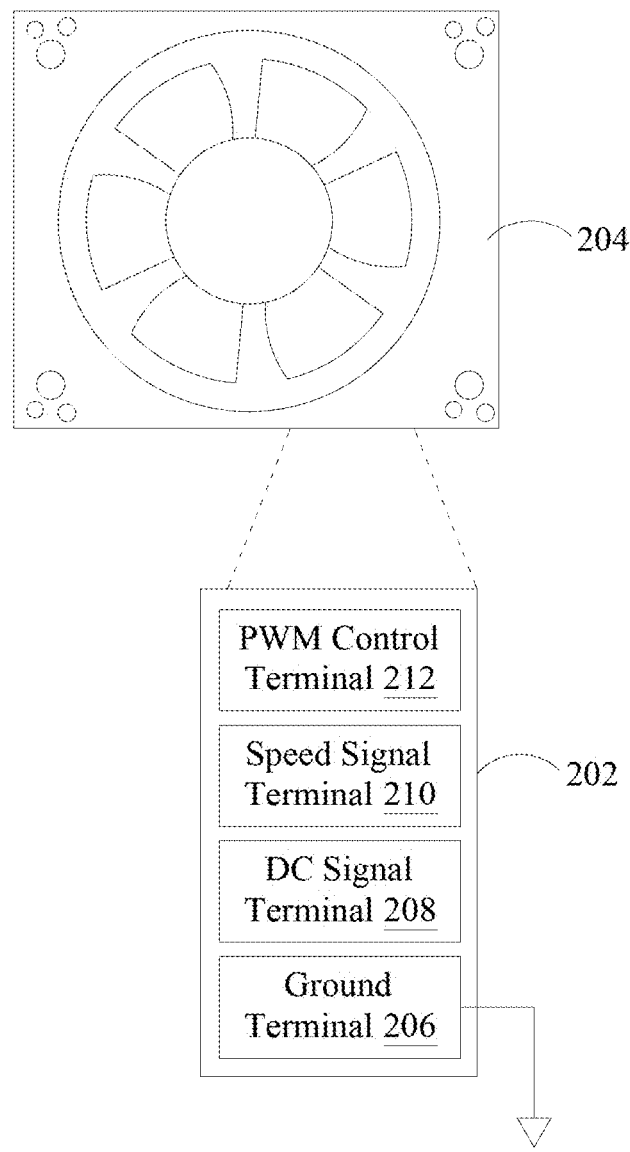
FIG. 2 is a schematic view of a general four-wire PWM fan.
Figure 8:
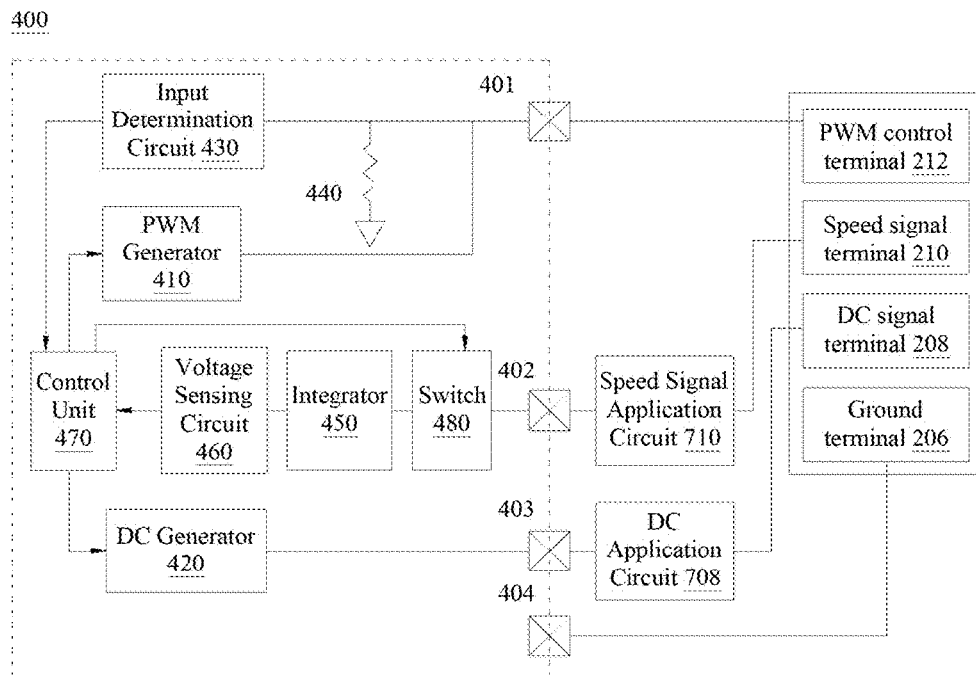
FIG. 8 is a block diagram of a fan driver system of a second embodiment of the present disclosure.
Figure 9:
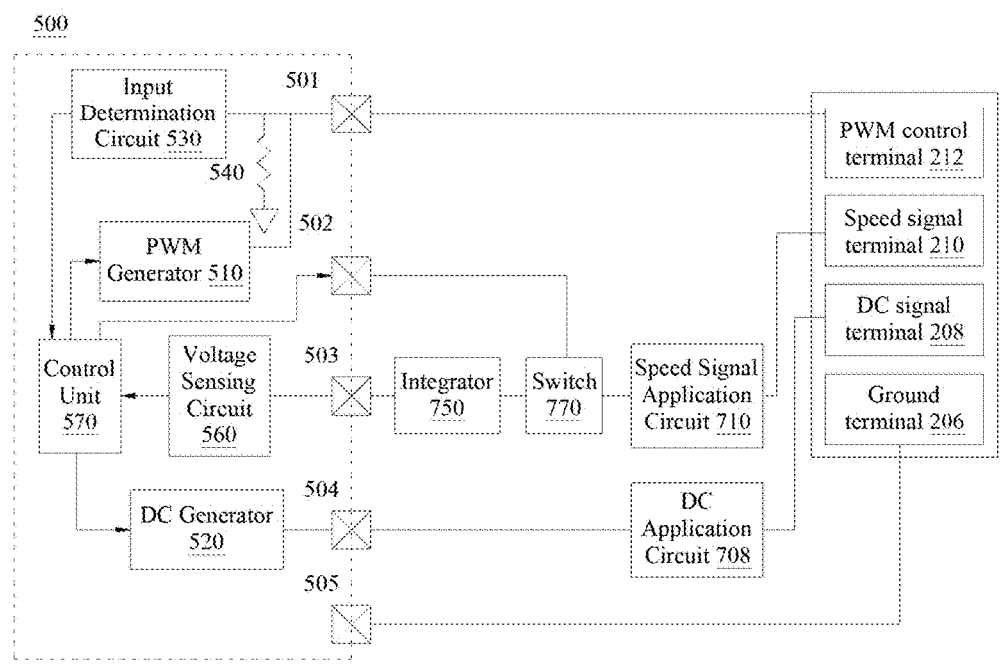
FIG. 9 is a block diagram of a fan driver system of a third embodiment of the present disclosure.
Figure 10:
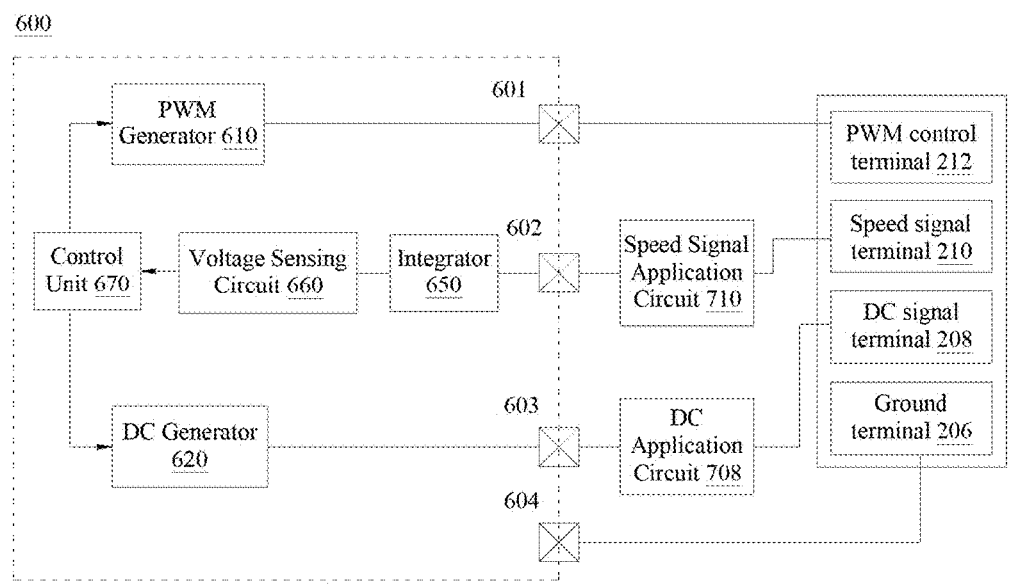
FIG. 10 is a block diagram of a fan driver system of a fourth embodiment of the present disclosure.

It should be noted that the fan connected with the fan driver system shown in FIG. 3 is the four-wire PWM fan of FIG. 2 for convenience in explanation; however, the fan driver system of FIG. 3 can also be connected with the three-wire DC fan of FIG. 1. Under a condition that the fan driver system is connected with the three-wire DC fan, a first pin 301 of the fan driver system is an empty pin, and a second pin 302, third pin 303 and a fourth pin 304 are respectively connected with the speed signal terminal 110, the DC signal terminal 108 and the ground terminal 106. The first pin 301 of the fan driver system is not connected with the fan when the fan is the three-wire DC fan, and connected with the PWM control terminal 212 of the fan when the fan is the four-wire PWM fan, so in description of the present disclosure the PWM generator 310, the input determination circuit 330 and the pull-down resistor pull-down resistor 340 are selectively connected to the PWM control terminal 212 of the fan. Similarly, the fan driver systems of the present disclosure shown in FIGS. 8 through 10 are also applicable to the three-wire DC fan, and the connection between the fan driver system and the three-wire DC fan can be with reference to FIG. 3 and above-mentioned description.

In addition, as shown in FIG. 3, the first pin 301 of the fan driver system is connected to the PWM control terminal 212 of the fan, the second pin 302 and the third pin 303 are respectively connected to the speed signal terminal 210 and the DC signal terminal 208 through a speed signal application circuit 710 and a DC application circuit 708, and the fourth pin 304 is connected to the ground terminal 206 of the fan. When the fan driver system is connected to the three-wire DC fan, the connections between the pins 302, 303, 304 and the three-wire DC fan are the same as the above-mentioned content, but the first pin 301 is an empty pin. The speed signal application circuit 710 and the DC application circuit 708 are configured to adjust amplitude of the signal transmitted from the fan driver system to the fan. For example, the amplitude of the speed signal output from the fan can be up to 12V but the acceptable amplitude of the signal for the integrator 350 is just 3.3V, so the speed signal application circuit 710 can lower the signal to adjust the amplitude of the speed signal to a range acceptable for the integrator 350. Similarly, the DC application circuit 708 can include a boost circuit, a buck circuit or a combination thereof.

In the fan driver system of FIG. 3, the integrator 350 is connected to the control unit 370 through the voltage sensing circuit 360, and the input determination circuit 330 is also connected to the control unit 370. The voltage sensing circuit 360 is configured to sense a signal from the integrator 350, such as the first integral signal and the second integral signal. The input determination circuit 330 is configured to sense the voltage of the pull-down resistor 340 to generate the determination signal. The control unit may include a circuit configured to receive and analyze the determination signal from the input determination circuit 330, a comparison circuit configured to compare the signal from the voltage sensing circuit 360, and a sampling circuit configured to determine a signal sampling timing. Upon receipt of information from the input determination circuit 330 and the voltage sensing circuit 360, the control unit 370 controls the DC generator 320 and the PWM generator 310 to drive the fan.

Figure 4:
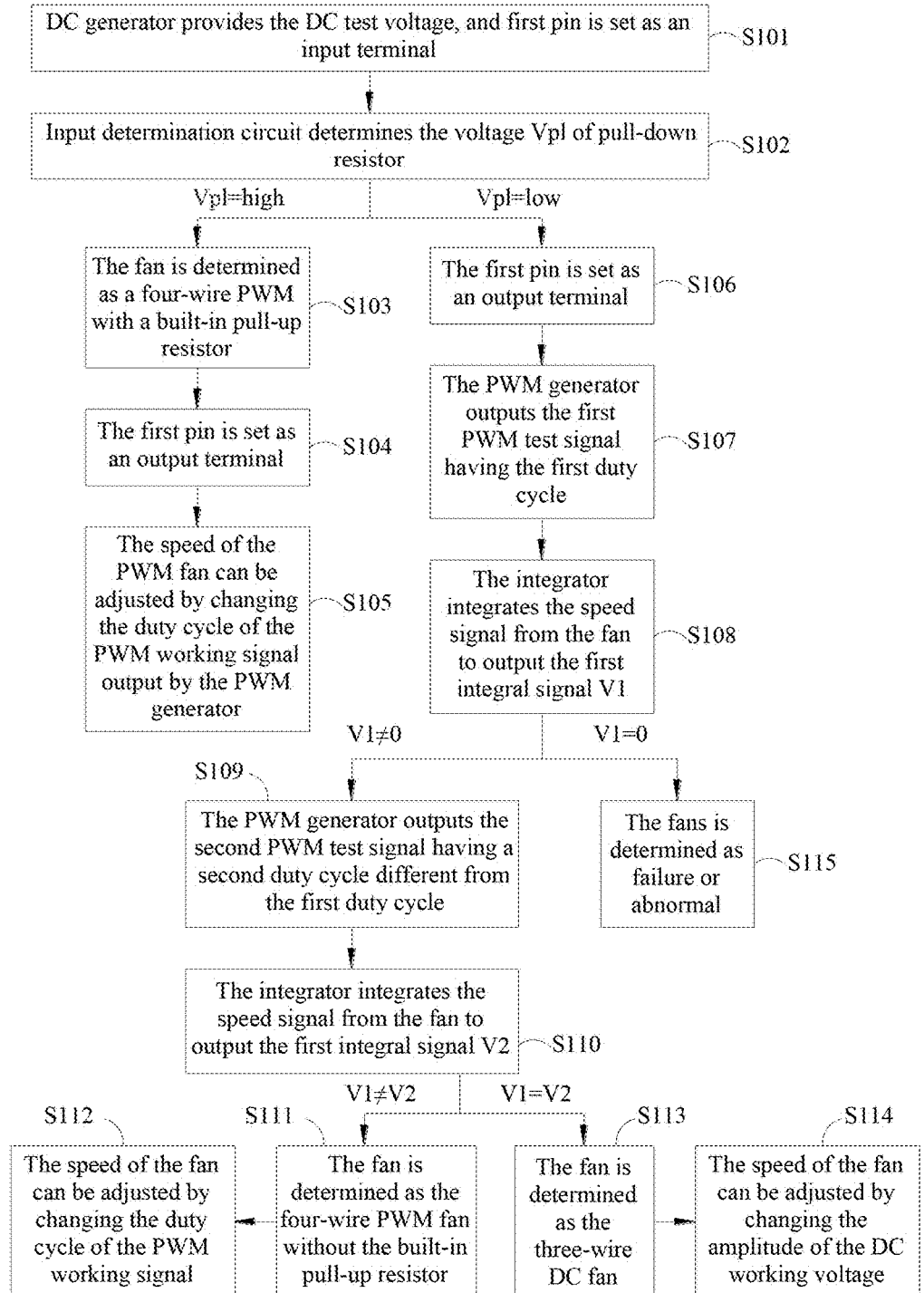
FIG. 4 is a flowchart of an embodiment of driving the fan driver system shown in FIG. 3.
Figure 5:
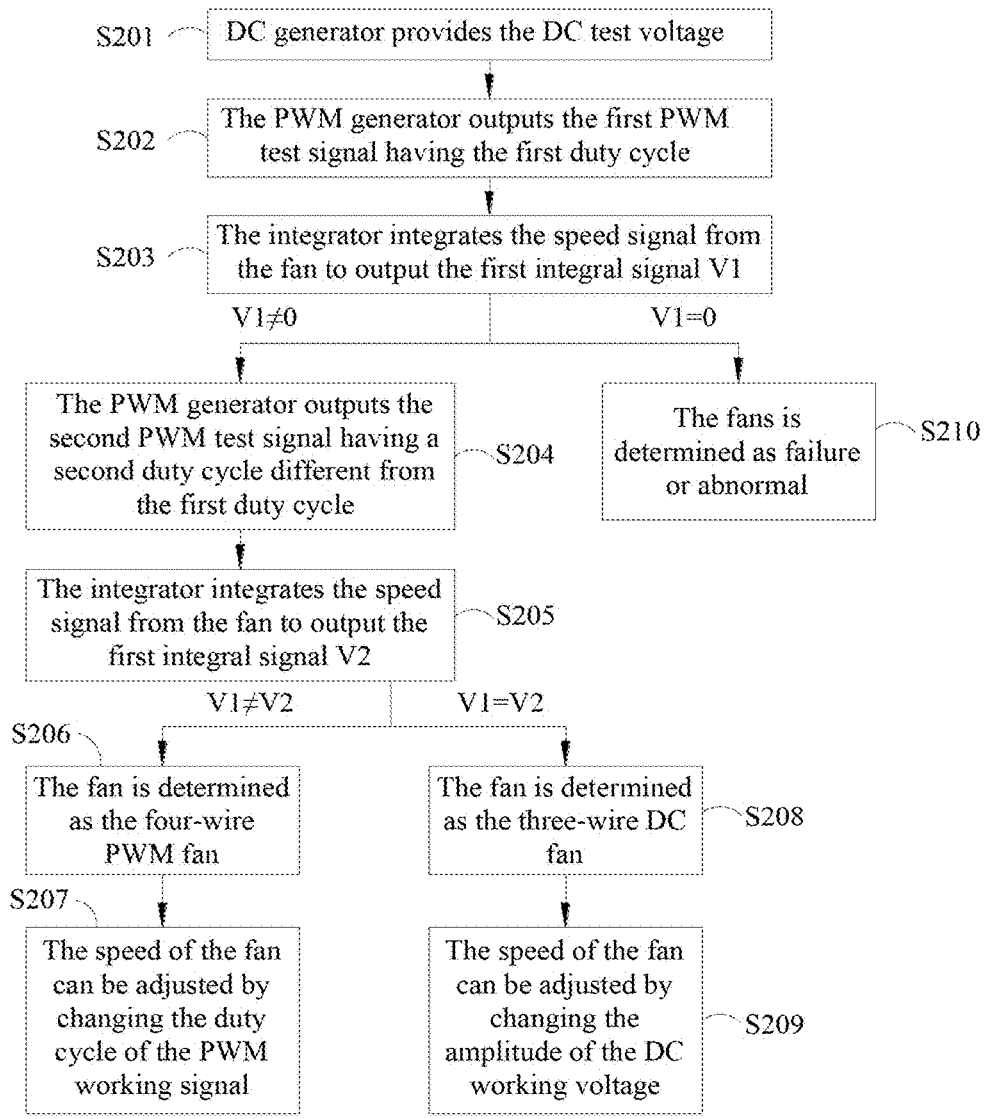
FIG. 5 is a flowchart of other embodiment of driving the fan driver system shown in FIG. 3.

The operation of the fan driver system of FIG. 3 is illustrated in cooperation with FIG. 4. FIG. 4 is a flow chart of an embodiment of driving the fan driver system of FIG. 3. Before the fan driver system of the embodiment of the present disclosure generates the determination, the type of the fan is unknown, so the fan driver system must performs a series of tests to check the type of the fan. In addition, it should be noted that the input terminals and the output terminals defined in the flowcharts of FIGS. 4 and 5 are for the fan driver system.

At the beginning of the flow, the test stage is performed to determine the type of the fan for further providing a proper driving manner. In step S101, the DC generator 320 provides the DC test voltage to the DC signal terminal of the fan. Preferably, the DC test voltage is in a range from 50% to 100% of the voltage of power supplied to the fan, for example, when the fan is supplied with 12V of voltage, the DC test voltage can be in the range from 6V to 12V. The 12V of voltage is a normal working voltage of the four-wire PMW and close to the maximal input voltage of the three-wire DC fan. The first pin 301 is set as the input terminal to receive the signal from the fan.

In step S102, if the fan is the four-wire PWM fan having a built-in pull-up resistor at the PWM control terminal 212 thereof, the PWM control terminal 212 of the fan is connected to the ground through the first pin 301 and the pull-down resistor 340, so as to form a loop. When the fan receives the DC voltage from the DC generator, the voltage Vpl of pull-down resistor 340 is in relatively high-level, and the input determination circuit 330 receives and records the voltage Vpl. On the other hand, if the fan is the three-wire DC fan, the first pin 301 is the empty pin, so the pull-down resistor 340 fails to receive the voltage from the fan, and the voltage Vpl is in relatively low-level. The input determination circuit 330 also receives and records the voltage Vpl. If the fan is the four-wire PWM fan without the built-in pull-up resistor at the PWM control terminal 212 thereof, the pull-down resistor 340 does not receive voltage from the fan, so the voltage Vpl of the pull-down resistor 340 is still in relatively low-level. The input determination circuit 330 receives and records the voltage Vpl.

When the voltage Vpl received by the input determination circuit 330 is in relatively high-level, step S103 is executed. In the step S103, the pull-down resistor 340 can receive voltage from the fan only when the fan is the four-wire PWM with the built-in pull-up resistor at the PWM control terminal 212, so the input determination circuit 330 determines the fan as the PWM fan and the way of driving the PWM fan is described in below steps. The type of the fans is determined, so the test stage is ended and an operation stage is started. In step S104, the first pin 301 is switched from the input terminal to an output terminal. Next, in step S105, the PWM generator 310 outputs the PWM working signal, and the speed of the PWM fan can be adjusted by changing the duty cycle of the PWM working signal. The DC generator 320 outputs a fixed voltage (such as 12V) as the working voltage of the four-wire PWM fan.

In the step S102, when the voltage Vpl received by the input determination circuit 330 is in relatively low-level, the fan may be the three-wire DC fan or the four-wire PWM fan without the built-in pull-up resistor at the PWM control terminal 212, so the input determination circuit 330 cannot directly determine the type of the fan and must execute steps after step S106 for further test. In the step S106, the first pin 301 is set as the output terminal, and in the step S107 the PWM generator 310 then outputs the first PWM test signal having the first duty cycle. If the fan is the four-wire PWM fan without the built-in pull-up resistor at the PWM control terminal 212 thereof, the first PWM test signal can be input to the fan through the first pin 301; if the fan is the three-wire DC fan, the first pin 301 is the empty pin, so the fan does not receive the first PWM test signal, and has no response for the first PWM test signal. The speed signal output from the speed signal terminal 210 of the fan is in response to the first PWM test signal. In step S108, the integrator 350 integrates the speed signal from the fan to output the first integral signal V1. It should be noted that when the speed signal application circuit 710 is not connected with the fan, the first integral signal V1 may not be zero because of existence of the pull-up resistor of the speed signal application circuit 710. Therefore, if the integral signal V1 is equal to zero substantially, it can be determined that the fan does not work because of failure, abnormal or error connection in step S115, and the fan driver system may alert the user to check the connection of the fan for troubleshooting the problem. If the first integral signal V1 is not equal to zero substantially, step S109 is executed next. In the step S109, the PWM generator 310 outputs the second PWM test signal having the second duty cycle which is different from the first duty cycle. In step S110, the integrator 350 integrates the speed signal from the fan again, so as to output the second integral signal V2.

According to the first integral signal V1 and the second integral signal V2, the fan can be determined as the three-wire DC fan or the four-wire PWM fan without the built-in pull-up resistor at the PWM control terminal 212 thereof. More specifically, when the first integral signal V1 is different from the second integral signal V2, it means the fan can respond to the PWM test signals having different duty cycles, so in step S111 the fan is determined as the four-wire PWM fan without the built-in pull-up resistor at the PWM control terminal 212 thereof, and the test stage is ended and the operation stage is started. In step S112, the PWM generator 310 outputs the PWM working signal, and the speed of the fan can be adjusted by changing the duty cycle of the PWM working signal. The DC generator 320 outputs the constant voltage (such as 12V) as the working voltage of the four-wire PWM fan.

In the other hand, if the first integral signal V1 and the second integral signal V2 are almost the same, it means that the connected fan does not respond to the PWM test signals having different duty cycles, so in step S113, the fan is determined as the three-wire DC fan, and the test stage is ended and the operation stage is started. In step S114, the DC generator 320 outputs the DC working voltage, and the speed of the fan can be adjusted by changing the amplitude of the DC working voltage. In this case, the PWM generator 310 is not necessary to generate any signal, so in the operation stage the PWM generator 310 selectively provides the PWM working signal to the fan.

In accordance with the fan driver system of the embodiment of the present disclosure, in the test stage the DC generator 320 and the PWM generator 310 respectively output the test signals, and the type of the fan can be determined according to the outputs of the input determination circuit 330 and the integrator 350. According to the detected type of the fan, in operation stage the DC generator 320 and the PWM generator 310 outputs the suitable signal for driving the fan and further controlling the speed of the fan.

The method of driving the fan driver system of the embodiment of present disclosure is not limited to the method shown in FIG. 4. For example, the method shown in FIG. 5 can also be applied to the fan driver system of the embodiment of the present disclosure. Please refer to FIG. 5 which shows a flowchart of other embodiment of the method of driving the fan driver system of FIG. 3. The main difference between the method of FIG. 5 and the method of FIG. 4 is that the method of FIG. 5 is used to merely determine whether the fan is the three-wire DC fan. More specifically, in step S201 the DC generator 320 provides a DC voltage to the fan. In this case, the first pin 301 is an output terminal. The step S202 through S205 are executed to obtain the first integral signal V1 and the second integral signal V2 which are then compared with each other to check whether the fan is the three-wire DC fan. When the first integral signal V1 is almost equal to the second integral signal V2, the fan is determined as the three-wire DC fan and, next, in step S209 the DC generator 320 outputs the DC working voltage to the fan and the speed of the fan can be adjusted by changing the amplitude of the DC working voltage. When the first integral signal V1 is not equal to the second integral signal V2, in the step S206 the fan is determined as the four-wire PWM fan and, next, in the step S207 the PWM generator 310 outputs the PWM working signal and the speed of the fan can be adjusted by changing the duty cycle of the PWM working signal.

Figure 6:
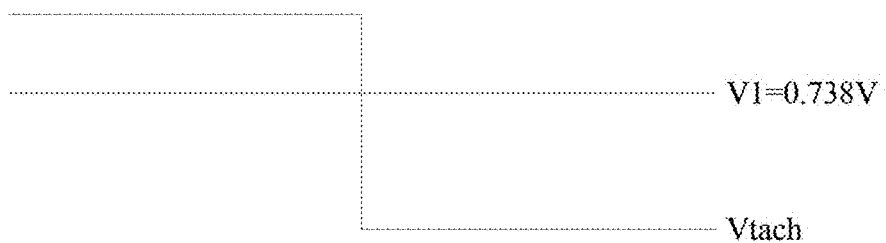
FIG. 6 is a waveform diagram of a speed signal Vtach corresponding to the first PWM test signal and a first integral signal V1 of the fan driver system of FIG. 3.
Figure 7:
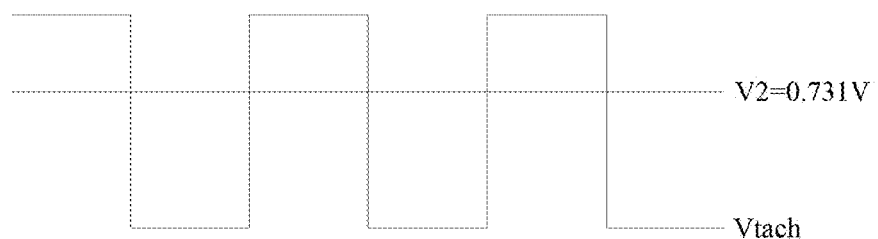
FIG. 7 is a waveform diagram of a speed signal Vtach corresponding to the second PWM test signal and a second integral signal V2 of the fan driver system of FIG. 3.

Please refer to FIGS. 6 and 7 which respectively show a waveform diagram of speed signal Vtach corresponding to the first PWM test signal and the first integral signal V1, and a waveform diagram of the speed signal Vtach corresponding to the second PWM test signal and the second integral signal V2. Here, the fan to be detected is the four-wire PWM fan. In FIG. 6, the duty cycle of the first PWM test signal is 50% and the DC test voltage is 12V. In FIG. 7, the duty cycle of the first PWM test signal is 100% and the DC test voltage is 12V. In the embodiment of the present disclosure, the integrator can be formed by at least resistor and at least capacitor. Generally speaking, the integration result of a square wave is similar to a sawtooth wave. However, a resistor with high resistance and a capacitor with high capacitance can be used in the fan driver system of the first embodiment of the invention, so as to obtain an almost constant value of the integration result while the integrator 350 integrates the square wave. In FIG. 6, the integrator 350 integrates the speed signal Vtach corresponding to the first PWM test signal, to output the first integral signal V1 which is about 0.738 V in FIG. 6. In FIG. 7, the integrator 350 integrates the speed signal Vtach corresponding to the second PWM test signal, so as to output the second integral signal V2 which is about 0.731 V in FIG. 7. The difference between the first integral signal V1 and the second integral signal V2 is up to 7 mV. In the tests performed by the above-mentioned method, when the connected fan is the four-wire PWM fan, the difference between the first integral signal V1 and the second integral signal V2 is in a range from 2 mV to 7 mV, and such voltage difference can be detected by a general circuit easily. When the connected fan is the three-wire DC fan, the first integral signal V1 and the second integral signal V2 are almost the same. Therefore, the type of the fan can be determined according to the difference between the first integral signal V1 and the second integral signal V2.

Please refer back to FIG. 3. The fan driver system of the first embodiment of the invention can be integrated into an analog fan drive chip 300. In FIG. 3, a part enclosed by a dashed line includes the components of the analog fan drive chip 300. More specifically, the analog fan drive chip 300 may include all components of the fan driver system of the first embodiment, and the first pin 301, the second pin 302, the third pin 303 and the fourth pin 304 configured to connect with the components. The first pin 301 is selectively connected to the PWM control terminal of the fan, the second pin 302 is connected to the speed signal terminal of the fan, the third pin 303 is connected to the DC signal terminal of the fan, and the fourth pin 304 is connected to the ground terminal of the fan. The other components are illustrated in above paragraphs, so their detailed descriptions are omitted. The PWM generator 310, the DC generator 320, the input determination circuit 330, the pull-down resistor 340, the integrator 350, the voltage sensing circuit 360 and the control unit 370 all included in the analog fan drive chip 300 can be implemented by analog circuits or components, and their production can be performed and integrated in an analog device manufacturing process, so that the manufacturing process of the analog fan drive chip 300 can be further simpler and has reduced cost. In an example, compared with the conventional technology in which a tachometer is used to detect the fan speed and the tachometer is a kind of digital circuit manufactured by digital manufacturing process and has a significantly large circuit area, the present disclosure has an advantage in that the system and the chip of the present disclosure can be implemented by pure analog design and manufacturing process without using the tachometer. In addition, the integrator 350 occupies a relatively low circuit area, so the fan driver system of the present disclosure is more flexible in entire circuit design.

Please refer to FIG. 8 which is a block diagram of a fan driver system of a second embodiment of the present disclosure. The difference between the second embodiment and the first embodiment is that the fan driver system of the second embodiment further includes a switch 480. The switch 480 is connected to the control unit 470, and the integrator 450 is connected to the speed signal terminal 210 of the fan through the switch 480. In the test stage, the PWM generator 410 outputs the first PWM test signal first and then switches to the second PWM test signal. After the second PWM test signal is output for a predetermined period and the voltage sensing circuit 460 receives the first integral signal V1 and the second integral signal V2 both, the control unit 470 turns off the switch 480 to disconnect the integrator 450 and the speed signal application circuit 710, so as to prevent other chip or circuit of the system from being affected by the integrator 450 while the other chip or circuit uses the signal from the speed signal application circuit 710 to calculate the fan speed.

When the duty cycle of the input PWM signal is changed, the four-wire PWM fan does not instantly change its speed in response to the change of PWM signal but gradually change to a predetermined speed corresponding to the new duty cycle after a time period. Similarly, the speed signal output from the fan completely responds the change of the fan speed after the time period, and the response time of the speed signal is second-scale. That is to say, if the integrator 450 instantly integrates the speed signal output from the fan after the output of the PWM generator 410 is switched from the first PWM test signal to the second PWM test signal, the second integral signal is possibly the same as the first integral signal and the fan driver system misdetermines the fan as the three-wire DC fan. In order to solve the problem, the voltage sensing circuit 460 can actively sense and record the first integral signal V1 and the second integral signal V2 output from the integrator 450 at every predetermined period, and the predetermined period can be 1, 2, 3, or 5 seconds. After the voltage sensing circuit 460 collects the first integral signal V1 and the second integral signal V2, the control unit 470 determines the type of the fan according to comparison between the first integral signal V1 and the second integral signal V2, and selectively controls the PWM generator 410 and the DC generator 420 to drive the fan, and then the control unit 470 turns off the switch 470. Finally, the process is ended.

The functions of other components of the second embodiment are similar to that of the first embodiment, so their detailed descriptions are omitted.

In addition, similar to the first embodiment, the fan driver system of the second embodiment can also be integrated into the analog fan drive chip 400. Substantially, the analog fan drive chip 400 includes the components inside the dashed line block shown in FIG. 8.

Please refer to FIG. 9 which shows a block diagram of a fan driver system of a third embodiment of the present disclosure and an analog fan drive chip 500 corresponding thereto. As show in FIG. 9, the speed signal terminal 210 of the fan is connected to the integrator 750 through the switch 770. The analog fan drive chip 500 includes a first pin 501, a second pin 502, a third pin 503, a fourth pin 504, a fifth pin 505, a PWM generator 510, a DC generator 520, an input determination circuit 530, a pull-down resistor 540, a voltage sensing circuit 560 and a control unit 570. The first pin 501 is selectively connected to the PWM control terminal 212 of the fan. The second pin 502 is connected with the control terminal of the switch 770. The third pin 503 is connected with the integrator 750. The fourth pin 504 is connected with the DC signal terminal 208 of the fan. The fifth pin 505 is connected with the ground terminal 206 of the fan. The PWM generator 510 is connected to the first pin 501. The DC generator 520 is connected to the fourth pin 504. The input determination circuit 530 is connected to the control unit 570 and the first pin 501. The pull-down resistor 540 is connected to the input determination circuit 530 and the first pin 501. The voltage sensing circuit 560 is connected to the control unit 570 and the third pin 503. The control unit 570 is connected to the PWM generator 510, the DC generator 520, the input determination circuit 530 and the voltage sensing circuit 560, and connected to the switch 770 through the second pin 502. In the test stage, the DC generator provides a DC test voltage. While the DC test voltage is provided, the input determination circuit 530 detects a voltage of the pull-down resistor 540 and outputs a determination signal according to the detected voltage. In the test stage, the PWM generator 510 provides a first PWM test signal having a first duty cycle, and a second PWM test signal having a second duty cycle different from the first duty cycle. The integrator 750 integrates the speed signal from the fan and corresponding to the first PWM test signal and then outputs a first integral signal to the voltage sensing circuit 560, and integrates the speed signal corresponding to the second PWM test signal to output a second integral signal to the voltage sensing circuit 560. The voltage sensing circuit 560 then compares the first integral signal and the second integral signal to output a comparison result. When the PWM generator 510 switches from the first PWM test signal to the second PWM test signal, and after the second PWM test signal is outputted for the predetermined period, the control unit 570 turns off the switch 770 to disconnect the integrator 750 and the speed signal application circuit 710. In the operation stage, according to the comparison result and the determination signal, the control unit 570 controls the PWM generator 510 to provide the PWM working signal to the fan, and controls the DC generator 520 to provide the DC working voltage to the fan, respectively.

More specifically, the integrator generally has a small size but still occupies a certain area in the analog fan drive chip, so in the third embodiment the integrator 750 and the switch 770 are disposed outside of the analog fan drive chip 500, so as to further reduce the size of the analog fan drive chip. In FIG. 9, the analog fan drive chip 500 includes the components enclosed by the dashed line block, and does not includes the integrator 750 and the switch 770. Compared with the fan driver chip 400 of aforesaid embodiment, the analog fan drive chip 500 of the third embodiment has an extra external pin (such as the second pin 502 shown in FIG. 9) to connect the control terminal of the switch 770 for control of the switching of the integrator 750, so that the fan speed signal can be controlled to selectively transmit to the integrator 750 through the speed signal application circuit 710 and the switch 770. The operations of the fan driver system and the analog fan drive chip 500 of the third embodiment are similar to the fan driver system and the analog fan drive chip 400 shown in FIG. 8, so their detailed descriptions are omitted.

Under a condition that the fan is only determined whether the fan is the three-wire DC fan or the four-wire PWM fan and not determined whether the four-wire PWM fan has the built-in pull-up resistor, the fan driver system or the fan driver chip of the present disclosure can be further simplified. Please refer to FIG. 10 which shows a block diagram of a fan driver system of a fourth embodiment of the present disclosure. In FIG. 10, the fan driver system includes a PWM generator 610, a DC generator 620, an integrator 650, a voltage sensing circuit 660 and a control unit 670. The PWM generator 610 is selectively connected to the PWM control terminal 212 of the fan, and the generator 620 is connected to the DC signal terminal 208 of the fan. The integrator 650 is connected to the speed signal terminal 210 of the fan. In the test stage, the PWM generator 610 provides the first PWM test signal having the first duty cycle, and the second PWM test signal having the second duty cycle different from the first duty cycle. The integrator 650 integrates the speed signal corresponding to the first PWM test signal to output the first integral signal, and integrates the speed signal corresponding to the second PWM test signal to output the second integral signal. In the operation stage, according to the first integral signal and the second integral signal, the control unit 670 controls the PWM generator 610 to selectively provide the PWM working signal to the fan and controls the DC generator 620 to provide the DC working voltage to the fan. An analog fan drive chip 600 is also shown in FIG. 10, and includes components enclosed by the dashed line block, and a first pin 601, a second pin 602, a third pin 603 and a fourth pin 604.

Please refer to FIG. 5 for the method of driving the fan driver system of FIG. 10. The step of using the input determination circuit to determine the voltage of the pull-down resistor to be in relatively high-level or low-level is omitted, so the fan driver system of FIG. 10 cannot determine whether the built-in pull-up resistor is disposed at the PWM control terminal of the fan. By executing the steps S201 through S205, it can determine whether the fan speed is changed in response to the PWM test signals having different duty cycles, so the fans can be determined as the four-wire PWM fan in the step S206, or as the three-wire DC fan in the step S208. More specifically, when the first integral signal is different from the second integral signal, the PWM generator 610 changes the duty cycle of the PWM working signal to control the speed of the fan in the step S207. In the other hand, when the first integral signal and the second integral signal are almost the same and the first integral signal is not equal to zero substantially, the DC generator 620 can change the DC working voltage to control the speed of the fan in the step S209. When the first integral signal is equal to zero substantially, the fan can be determined as failure or abnormal, or to have error connection in step S210, so the fan driver system or the analog fan drive chip 600 can generate an alert signal to notice the user for further troubleshooting.

Therefore, the fan driver system and the analog fan drive chip 600 without the input determination circuit and the pull-down resistor can has a simplified circuit structure and reduced circuit space. In addition, the first pin 601 of the fan driver system and the analog fan drive chip 600 can be kept as the signal output terminal without being switched between the signal input terminal and the signal output terminal, so the time for determining the type of the fan can be saved and the complexity of the method of driving the fan driver system can also be reduced.

In some embodiments, the fan driver system or the analog fan drive chip of the present disclosure has at least one of following advantages.

(1) The fan driver system or the analog fan drive chip of the present disclosure can provide the DC test voltage and the PWM test signals having different duty cycles in the test stage, so as to automatically detect the type of the connected fan.

(2) The fan driver system or the analog fan drive chip of the present disclosure uses the integrator circuit rather than the tachometer, so as to facilitate the system or the chip to be integrated with the analog device.

(3) The fan driver system or the analog fan drive chip of the present disclosure extracts the integral signal from the integrator after the PWM test signals are switched for the predetermined period, so as to prevent the error caused by delay of the speed signal.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A fan driver system, applied to detect a type of a fan and drive the fan according to a detection result, and the fan driver system comprising:
   a direct current (DC) generator electrically connected to the fan and configured to provide a DC test voltage to the fan;
   a pull-down resistor selectively connected to the fan;
   an input determination circuit electrically connected to the pull-down resistor, and configured to detect a voltage of the pull-down resistor and output a determination signal according to the detected voltage;
   a control unit electrically connected to the input determination circuit and the DC generator, and configured to receive the determination signal;
   a pulse width modulation (PWM) generator electrically connected to the fan and the control unit, and configured to respectively provide a first PWM test signal and a second PWM test signal to the fan, wherein a first duty cycle of the first PWM test signal is different from a second duty cycle of the second PWM test signal;
   an integrator electrically connected to the fan, and configured to integrate a speed signal from the fan and corresponding to the first PWM test signal, so as to output a first integral signal, and integrate the speed signal corresponding to the second PWM test signal, so as to output a second integral signal; and
   a voltage sensing circuit electrically connected the integrator and the control unit;
   wherein according to the first integral signal, the second integral signal and the determination signal, the control unit is configured to drive the PWM generator to selectively provide a PWM working signal to the fan, and drive the DC generator to provide a DC working voltage to the fan.

2. The fan driver system according to claim 1, further comprising:
   a switch electrically connected to the control unit, the integrator and the fan;
   wherein under a condition that the PWM generator is switched to output the second PWM test signal, after the second PWM test signal is output for a predetermined period, the control unit is configured to turn off the switch to disconnect the integrator and the fan.

3. The fan driver system according to claim 1, wherein when the first integral signal is not equal to the second integral signal and the determination signal indicates that the voltage of the pull-down resistor is in high-level, the fan is determined as a four-wire PWM fan with a built-in pull-up resistor, and the speed of the fan is adjustable by changing a duty cycle of the PWM working signal.

4. The fan driver system according to claim 1, wherein when the first integral signal is not equal to the second integral signal and the determination signal indicates that the voltage of the pull-down resistor is in low-level, the fan is determined as a four-wire PWM fan without a built-in pull-up resistor, and the speed of the fan is adjustable by changing a duty cycle of the PWM working signal.

5. The fan driver system according to claim 1, wherein when the first integral signal is equal to the second integral signal and the determination signal indicates that the voltage of the pull-down resistor is in low-level, the fan is determined as a three-wire DC fan, and the speed of the fan is adjustable by changing amplitude of the DC working voltage.

6. An analog fan drive chip, applied to detect a type of a fan and drive the fan according to a detection result, and the analog fan drive chip comprising:
- a first pin electrically connected to the fan selectively;
- a second pin electrically connected to the fan;
- a third pin electrically connected to the fan;
- a DC generator electrically connected to the third pin and configured to provide a DC test voltage to the fan;
- a pull-down resistor electrically connected to the first pin;
- an input determination circuit electrically connected to the pull-down resistor and configured to detect a voltage of the pull-down resistor while the DC test voltage is provided, and output a determination signal according to the detected voltage;
- a control unit electrically connected to the input determination circuit and the DC generator, and configured to receive the determination signal;
- a PWM generator electrically connected to the first pin and the control unit, and configured to respectively provide a first PWM test signal and a second PWM test signal to the fan, wherein a first duty cycle of the first PWM test signal is different from a second duty cycle of the second PWM test signal;
- an integrator electrically connected to the second pin, and configured to integrate a speed signal from the fan and corresponding to the first PWM test signal, so as to output a first integral signal, and integrate the speed signal corresponding to the second PWM test signal, so as to output a second integral signal; and
- a voltage sensing circuit electrically connected to the integrator and the control unit;
- wherein according to the first integral signal, the second integral signal and the determination signal, the control unit is configured to drive the PWM generator to selectively provide a PWM working signal to the fan, and drive the DC generator to provide a DC working voltage to the fan.

7. The analog fan drive chip according to claim 6, further comprising:
- a switch electrically connected to the control unit, the integrator and the second pin;
- wherein under a condition that the PWM generator is switched to output the second PWM test signal, after the second PWM test signal is output for a predetermined period, the control unit is configured to turn off the switch to disconnect the integrator and the second pin.

8. The analog fan drive chip according to claim 6, wherein when the first integral signal is not equal to the second integral signal and the determination signal indicates that the voltage of the pull-down resistor is in high-level, the fan is determined as a four-wire PWM fan with a built-in pull-up resistor, and the speed of the fan is adjustable by changing a duty cycle of the PWM working signal.

9. The analog fan drive chip according to claim 6, wherein when the first integral signal is not equal to the second integral signal and the determination signal indicates that the voltage of the pull-down resistor is in low-level, the fan is determined as a four-wire PWM fan without a built-in pull-up resistor, and the speed of the fan is adjustable by changing a duty cycle of the PWM working signal.

10. The analog fan drive chip according to claim 6, wherein when the first integral signal is equal to the second integral signal and the determination signal indicates that the voltage of the pull-down resistor is in low-level, the fan is determined as a three-wire DC fan, and the speed of the fan is adjustable by changing an amplitude of the DC working voltage.

11. An analog fan drive chip, applied to detect a type of a fan and drive the fan according to a detection result, the analog fan drive chip connected to a switch and an integrator, and the analog fan drive chip comprising:
- a first pin electrically connected to the fan selectively;
- a second pin electrically connected to the switch;
- a third pin electrically connected the fan through the integrator and the switch;
- a fourth pin electrically connected to the fan;
- a DC generator electrically connected to the fourth pin and configured to provide a DC test voltage to the fan;
- a pull-down resistor electrically connected to the first pin;
- an input determination circuit electrically connected to the pull-down resistor and configured to detect a voltage of the pull-down resistor while the DC test voltage is provided, and output a determination signal according to the detected voltage;
- a control unit electrically connected to the input determination circuit and the DC generator, and configured to receive the determination signal;
- a PWM generator electrically connected to the first pin and the control unit, and configured to respectively provide a first PWM test signal and a second PWM test signal to the fan, wherein a first duty cycle of the first PWM test signal is different from a second duty cycle of the second PWM test signal; and
- a voltage sensing circuit electrically connected to the first pin and the control unit;
- wherein the integrator integrates a speed signal from the fan and corresponding to the first PWM test signal, so as to output a first integral signal, and integrate the speed signal corresponding to the second PWM test signal, so as to output a second integral signal;
- wherein under a condition that the PWM generator is switched to output the second PWM test signal, after the second PWM test signal is output for a predetermined period, the control unit turns off the switch to disconnect the integrator and the fan; and
- wherein the control unit is electrically connected to the integrator through the second pin, and according to the first integral signal, the second integral signal and the determination signal, the control unit is configured to drive the PWM generator to provide a PWM working signal to the fan, and drive the DC generator to provide a DC working voltage to the fan.

12. A fan driver system, applied to detect a type of a fan and drive the fan according to a detection result, and the fan driver system comprising:
- a PWM generator electrically connected to the fan and configured to respectively provide a first PWM test signal and a second PWM test signal to the fan, wherein a first duty cycle of the first PWM test signal is different from a second duty cycle of the second PWM test signal;
- an integrator electrically connected to the fan and configured to integrate a speed signal from the fan corresponding to the first PWM test signal, so as to output a first integral signal, and integrate the speed signal corresponding to the second PWM test signal, so as to output a second integral signal;
- a voltage sensing circuit electrically connected to the integrator;

a control unit electrically connected to the PWM generator and the voltage sensing circuit, and configured to drive the PWM generator to selectively provide a PWM working signal to the fan according to comparison between the first integral signal and the second integral signal; and a DC generator electrically connected the fan and the control unit, wherein the control unit is configured to drive the DC generator to provide a DC working voltage to the fan according to comparison between the first integral signal and the second integral signal.

13. The fan driver system according to claim 12, wherein when the first integral signal is not equal to the second integral signal, the PWM generator changes a duty cycle of the PWM working signal to control the speed of the fan, and when the first integral signal and the second integral signal are almost the same and the first integral signal is not equal to zero substantially, the DC generator changes amplitude of the DC working voltage to control the speed of the fan.

* * * * *